United States Patent [19]

Netravali et al.

[11] 4,023,199

[45] May 10, 1977

[54] METHOD AND APPARATUS FOR ENCODING COLOR VIDEO SIGNALS

[75] Inventors: Arun Narayan Netravali, Matawan; Charles Benjamin Rubinstein, Colts Neck, both of N.J.

[73] Assignee: Bell Telephone Laboratories, Incorporated, Murray Hill, N.J.

[22] Filed: Mar. 9, 1976

[21] Appl. No.: 665,188

[52] U.S. Cl. .............................. 358/13; 325/38 B; 358/135
[51] Int. Cl.² .......................................... H04N 9/32
[58] Field of Search ............... 358/13; 178/DIG. 3; 325/38 R, 38 B

[56] References Cited

UNITED STATES PATENTS

| | | | |
|---|---|---|---|
| 3,773,971 | 11/1973 | Sainte-Beuve | 358/13 |
| 3,803,348 | 4/1974 | Limb et al. | 178/DIG. 3 |
| 3,860,953 | 1/1975 | Cutler et al. | 358/13 |
| 3,984,626 | 10/1976 | Mounts et al. | 178/DIG. 3 |

FOREIGN PATENTS OR APPLICATIONS 1,344,312  1/1974  United Kingdom ................ 358/13

Primary Examiner—Benedict V. Safourek
Assistant Examiner—Mitchell Saffian
Attorney, Agent, or Firm—Barry H. Freedman

[57] ABSTRACT

It has been determined that the amplitude accuracy required for specification of the chrominance portion of a color video signal is related to the spatial activity of the luminance portion of the signal. Accordingly, coding efficiency is improved in a digital transmission system by (1) defining a measure of the luminance activity and (2) changing chrominance coding strategy in accordance with the luminance activity measure. In one specific arrangement, coarse and fine quantizers are provided in an adaptive DPCM encoder. The coarse quantizer is used where luminance activity is high and the fine quantizer used only when the activity is low. In another arrangement, a variable gain circuit is disposed in the direct loop of an encoder with a fixed quantizer, and a variable attenuator is disposed in the feedback loop. For large spatial activity, the gain of the amplifier and the attenuator coefficient are held low; for small spatial activity the opposite condition prevails.

13 Claims, 9 Drawing Figures

METHOD AND APPARATUS FOR ENCODING COLOR VIDEO SIGNALS

BACKGROUND OF THE INVENTION

1. Field of the Invention

This invention relates generally to video signal processing and, more particularly, to digital processing of the chrominance signals that are developed in a color video system.

2. Description of the Prior Art

Considerable attention has recently been given to the area of digital coding of color video signals, in general, and to the reduction of the number of bits needed for good picture rendition, in particular. One coding technique that has been suggested is described in U.S. Pat. No. 3,803,348, issued to J. O. Limb et al on Apr. 9, 1974, and assigned to the same assignee as the present application. The Limb technique is based upon the assumption that significant chrominance changes generally occur in the vicinity of significant luminance changes. Accordingly, Limb's apparatus is arranged to detect instances when the difference between adjacent luminance samples is found to exceed a preselected threshold level. When a significant change is detected, the chrominance signal that is transmitted is an average of the chrominance values between successive significant changes. On the other hand, when the luminance signal is relatively flat, no chrominance signal is transmitted, thereby reducing the number of bits that are needed.

For the few occasions when chrominance changes occur without corresponding luminance changes, a modified approach, as set out in U.S. Pat. No. 3,860,953, issued to C. C. Cutler et al on Jan. 14, 1975 may be used. In this technique, when a chrominance change occurs in a region in which no corresponding luminance difference is present, the luminance signal is intentionally modified to introduce therein a significant change. Accordingly, when the desired chrominance information is then transmitted, no addressing information is needed at the receiving decoder; which simply detects both the introduced and the regularly occurring luminance changes.

While the foregoing and other similar techniques attain the primary objective of decreasing the number of bits which must be utilized to transmit chrominance information, it has been found that the subjective quality of the pictures produced is often not satisfactory. Accordingly, it is the broad object of the present invention to improve image fidelity while maximizing coder efficiency.

The foregoing and additional objects are achieved in accordance with the invention by a technique which varies the degree of precision with which chrominance signals are encoded as a function of the spatial activity of the luminance signal in the neighborhood or region being processed. Specifically, it has been found that for neighborhoods of high luminance spatial activity, the chrominance signal may be coarsely encoded without noticeably sacrificing picture quality. Conversely, in areas of low luminance activity, the chrominance signal should be encoded more finely (with a higher degree of precision) since inaccuracies are more visible in such regions.

The above-described principles are generally achieved by (1) defining a measure of the luminance activity in a particular area of the image being processed and (2) changing the coding strategy of the corresponding chrominance signal in accordance with the activity measure.

In one specific arrangement, the activity measure is computed from is weighted average of luminance slopes of picture elements in the neighborhood being processed, and one of several quantizers is inserted in the chrominance coder depending upon the value of the average. In another arrangement, the activity measure is computed as the maximum weighted slope in a given neighborhood, and quantizer precision is adjusted by simultaneously varying the gain of an amplifier disposed in the forward loop of the chrominance quantizer and the attenuation of an attenuator disposed in the feedback loop. As a still further alternative, coding strategy of one chrominance signal is based jointly on luminance activity and the spatial activity of the other chrominance signal.

By processing chrominance signals in accordance with the present invention, it has been found that for a given picture quality, the number of bits needed for quantization is reduced by 20–30 percent as compared to prior art arrangements. Alternatively, if the bit rate is not changed, the present invention achieves significantly better subjective picture quality compared to conventional encoders.

DESCRIPTION OF THE DRAWING

The previously described features and advantages of the present invention will be better understood from a consideration of the following detailed description when read in light of the accompanying drawing in which.

DETAILED DESCRIPTION

Figure 1:
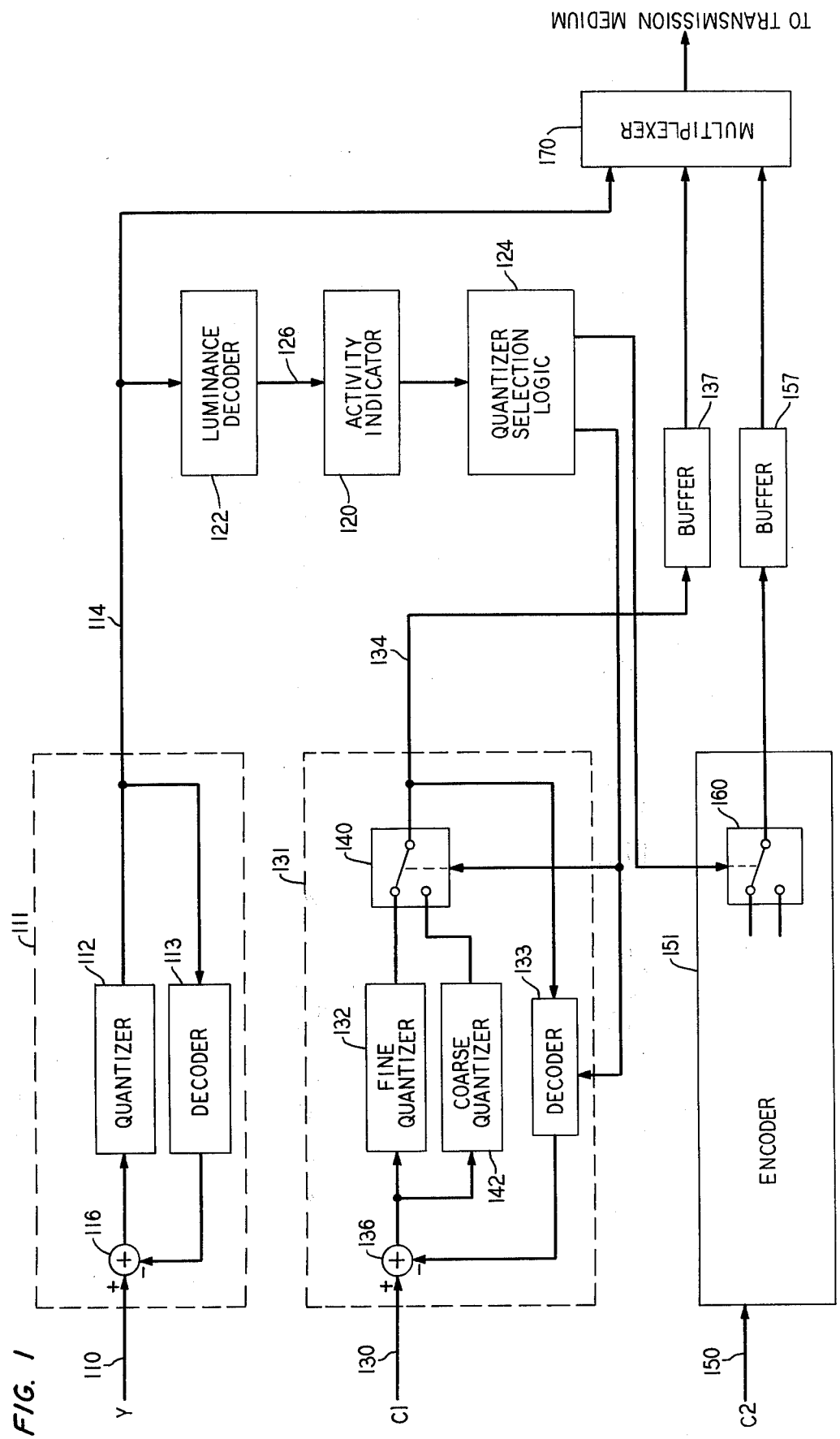
FIG. 1 is a block diagram of apparatus for encoding color video signals constructed in accordance with the instant invention.

A block diagram of apparatus in accordance with the invention for encoding the luminance component Y and the chrominance components C1 ad C2 of a color video signal, is shown in FIG. 1. The luminance component is coupled on line 110 to the input of a luminance DPCM encoder 111, which conventionally includes a quantizer 112 in its forward loop and a decoder 113 in its feedback loop. The quantizer 112 is arranged to provide at its output on line 114 a digital representation of the error signal applied at its input, quantized to the nearest available level. The error signal is returned to analog form in decoder 113, and thence subtracted from the input signal in comparator 116. Accordingly, each further output of quantizer 112 represents, in digital form, the error or difference between the present and previous quantized luminance samples.

The chrominance components C1 and C2 are coupled on lines 130 and 150 to the inputs of chrominance DPCM encoders 131 and 151, which may be identical to each other structurally, even though the quantizer input/output characteristics may differ. For this reason, the details of encoder 131 only will be given hereinafter. Like encoder 111, encoder 131 includes a decoder 133 in its feedback loop, and a comparator 136 for forming the difference between the input signal and the decoder output. However, encoder 131, in accordance with the invention, includes multiple quantizers, exemplified by quantizers 132 and 142, in its forward loop. The output of only one quantitizer (132, 142) is coupled to output line 134 and to the input of decoder 133, the particular quantizer depending upon the position of a switch 140. In its first position, (shown in FIG. 1), quantizer 132 is employed in the encoder circuit, and that quantizer may be arranged for "fine" quantization of the error signal applied thereto. In the second switch position (opposite to that shown in FIG. 1), quantizer 142 is instead employed in the encoder circuit, and that quantizer may be arranged for "coarse" quantization of the error signal applied thereto. As an example of what is meant by "coarse" and "fine" in this context, quantizer 142 may, for example, be arranged to provide a three bit output, corresponding to a capability of distinguishing between eight possible input levels. By contrast, quantizer 132 may, for example, be arranged to provide a four bit output, corresponding to a capability of distinguishing between 16 possible input levels.

The position of switch 140 (as well as a corresponding switch 160 shown within encoder 151) is a function in accordance with the invention, of the output of an activity indicator circuit 120, to be described in more detail hereinafter, which is sensitive to the spatial activity of the luminance signal being processed. For this purpose, circuit 120 receives its input on line 121 from the output of a luminance decoder 122, which is arranged to convert the DPCM output of encoder 111 to an equivalent PCM code. Circuit 120 supplies a control signal to a quantizer selection logic circuit 124, also described in detail hereinafter, which controls the positions of switches 140 and 160 via lines 138 and 168, respectively. Circuit 124 is arranged so that when the spatial activity is high, coarse (relatively low precision) quantization of the chrominance signals C1 and C2 is effected, while if the luminance spatial activity is low, fine (relatively high precision) quantization of C1 and C2 occurs. The output of circuit 124 is also used to control the operation of decoder 133, via a signal on line 125, so that the outputs of both quantizers 132 and 142 are properly decoded.

The encoded luminance signal Y, as well as the encoded chrominance signal $C_1$ and $C_2$ from encoders 131 and 151, respectively, are applied to a multiplexer 170 for transmission to a remote location. If desired, buffers 137 and 157 may be interposed in the output lines of encoders 131 and 151, respectively, to take account of the varying bit rates produced thereby.

Figure 2:
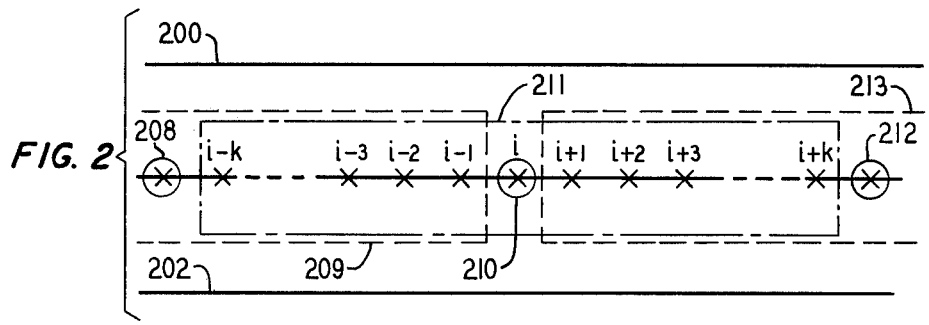
FIG. 2 is an illustration of a definition of a "neighborhood" of a chrominance sample.

Referring now to FIG. 2, there is shown an illustration of one definition of a "selected portion" or "neighborhood" of a scene in which luminance activity may be measured. Line 201 represents a particular one of the scan lines of the video scene being processed, while lines 200 and 202 represent the preceding and subsequent scan lines, respectively. On line 201, the "X" marks represent luminance samples, while the "0" marks represent chrominance samples. As is usual in color video signal processing, the chrominance samples may be spaced substantially further apart than are luminance samples.

One possible neighborhood for chrominance sample 210 can be the luminance samples contained within the box labeled 211. As will be seen, this neighborhood is symmetrically centered around luminance sample $i$, and extends from the luminance sample $i-k$ just after the preceding chrominance sample 208 to the luminance sample $i+k$ just before the next chrominance sample 212. If this neighborhood were chosen for chrominance sample 210, then the neighborhoods for chrominance samples 208 and 212 would be the luminance samples contained within boxes 209 and 213, respectively.

Other neighborhoods can be defined by simply enlarging or narrowing the boxes constructed around each chrominance sample. In the case of narrowing, the limiting case would be a single luminance sample corresponding to each chrominance sample, as shown, for example, in the following table:

| Chrominance sample | Luminance sample in neighborhood |
| --- | --- |
| . | . |
| . | . |
| . | . |
| 208 | $i-k-1$ |
| 210 | $i$ |
| 212 | $i+k+1$ |
| . | . |
| . | . |
| . | . |

In the case of enlarging the neighborhood, the boxes can be extended to overlap even more than as shown in FIG. 2; however, extension beyond that shown in FIG. 2 would not efficiently utilize local luminance information in chrominance encoding, and would be unusual. Additionally, the neighborhood considered could be extended to two dimensions by considering the luminance samples in the preceding or subsequent lines 200, 202; horizontal slopes, i.e., differences between adjacent samples in the same line or vertical slopes, i.e., differences between corresponding samples in different lines, would then be used. However, these extensions would require the provision of a line memory or other apparatus for storing luminance values for several lines, thereby adding to overall systems complexity.

Figure 3:
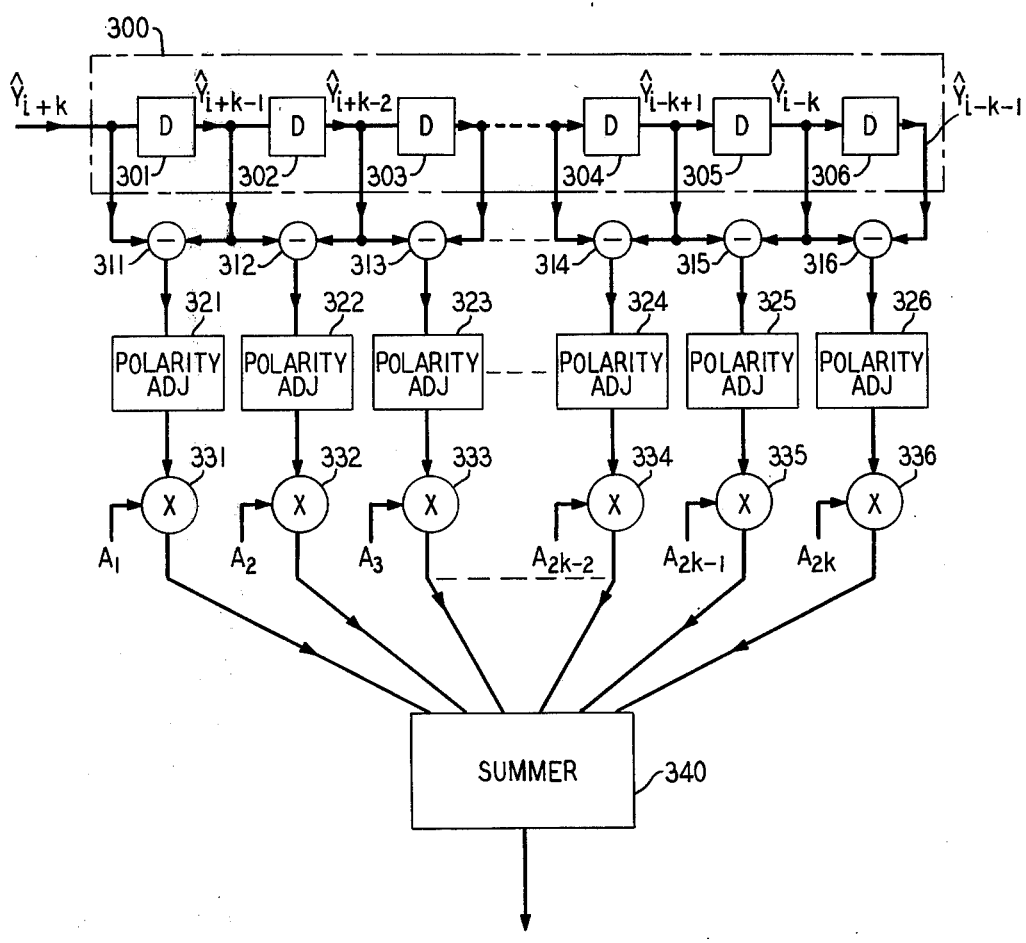
FIG. 3 is a block diagram of one embodiment of the luminance activity circuit of FIG. 1.

Referring now to FIG. 3, there is shown a circuit for computing a measure of luminance activity in the neighborhood defined in FIG. 2. The circuit, which corresponds to block 120 of FIG. 1, includes a delay line 300 having multiple stages, each of which is capable of storing therein the value of a single luminance sample. Specifically, for the neighborhood of FIG. 2, delay line 300 includes two $k$ stages, the first three of which (stages 301-303) and the last three of which (stages 304-306) are shown. Each stage of delay line 300 is arranged to delay the input thereto for one sample interval, so that when the input to the first stage is the $i+k^{th}$ sample, the outputs of the remaining stages are the $i+k-1$, $i+k-2$, $i+k-3$ ... $i$ ... $i-k+2$, $i-k+1$, $i-k^{th}$ samples, or, in other words, all of the luminance values in the neighborhood of the chrominance sample 210 of FIG. 2.

The horizontal slope between adjacent luminance samples is computed by coupling the input and output of each stage of delay line 300 to an associated subtraction circuit which is arranged to provide at its output the difference between the inputs applied thereto. Thus, the input and output of stage 301 are applied to subtraction circuit 311, the output of which represents the horizontal slope between luminance samples $i+k$ and $i+k-1$. Similarly, the input and output of stage 302 are applied to subtraction circuit 312, the output of which represents the horizontal slope between luminance samples $i+k-1$ and $i+k-2$, and the input and output of stages 303-306 are coupled to subtraction circuits 313-316 for the same purpose.

The outputs of subtraction circuits 311-316 are applied to associated polarity adjusting circuits 321-326, each of which is designed to produce at its output a signal equal to the magnitude of the input thereto, but of a uniform polarity. Thus, as an example, the output of adjusting circuit 321 is given by:

$$|Y_{i+k-1} - Y_{i+k}| \quad (1)$$

where $Y_{i+k-1}$ and $Y_{i+k}$ are the luminance values of the $i+k-1^{th}$ and $i+k^{th}$ samples, respectively.

The outputs of circuits 321-326 are applied to the inputs of a series of multiplier circuits 331-336 each of which are arranged to provide an output equal to the input magnitude times an adjustable multiplier coefficient "A". For example, the output of circuit 331 is given by $A_1 |Y_{i+k-1} - Y_{i+k}|$, the output of circuit 332 is given by $A_2 |Y_{i+k-2} - Y_{i+k-1}|$, and so on. The values of coefficients $A_1$ through $A_{2k}$ can be selected experimentally; it has been found advantageous, at least in some arrangements, to more heavily weight the coefficients corresponding to luminance samples near the center of the neighborhood selected, as compared to the coefficients corresponding to samples near the outer ends of the neighborhood.

While the outputs of multiplier circuits 331-336 can be processed in various ways, one arrangement shown in FIG. 3 is simply to algebraically combine the outputs in a summing circuit 340.

Figure 4:
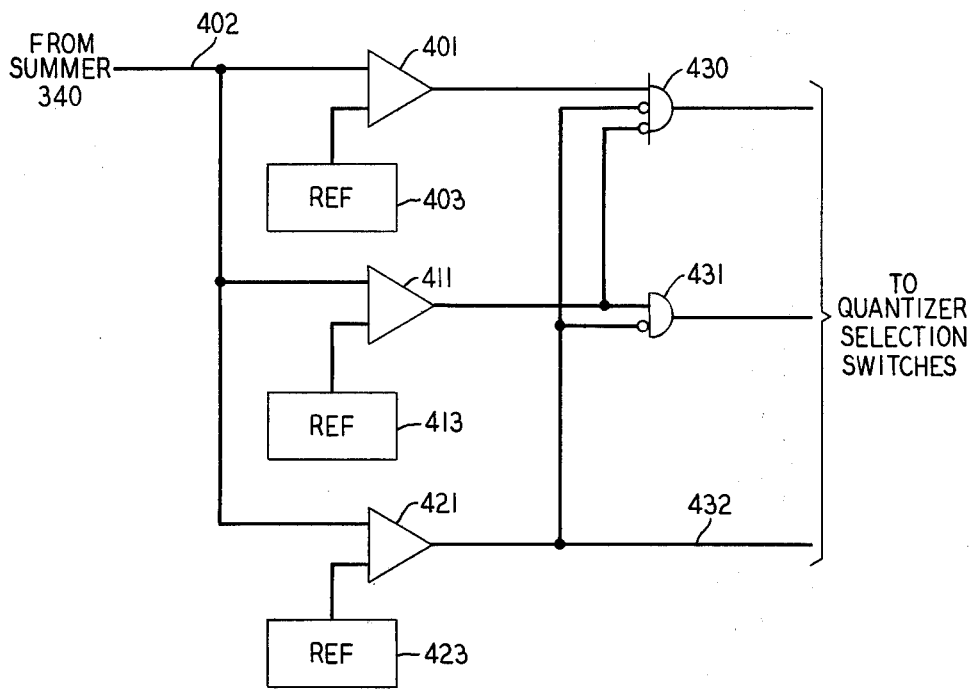
FIG. 4 is a block diagram of the quantizer selection logic of FIG. 1.

The output of summer 340, denominated the luminance activity indicator signal, is used to control the chrominance quantizer selection switches 140 and 160 of FIG. 1 via logic circuitry shown in FIG. 4. For the case of two quantizers in encoders 131 and 151, the logic may simply comprise a single threshold circuit or comparator 401, which is arranged to produce a positive output when the output of summer 340 on line 402 is greater than the output of a reference voltage generator 403. In such event, the control signal may be used to throw switches 140 and 160 to the positions opposite to those shown in FIG. 1, thereby effecting coarse rather than fine quantization of the chrominance signals. For the case where more than two quantizers are used, the output of summer 340 can be applied to additional comparators, such as comparators 411, 421, which receive inputs from additional reference sources 413, 423, respectively. If the thresholds of comparators 401, 411 and 421 are increasingly greater, then their outputs can be applied to multiposition quantizer selection switches (not shown) via AND gates 430 and 431, the former of which receives an input from comparator 401, and inverted inputs from comparators 411 and 421, and the latter of which receives an input from comparator 411 and an inverted input from comparator 421. In this way, if the threshold of only comparator 401 is exceeded, only the output of gate 430 is high; if the thresholds of comparators 401 and 411 are both exceeded, only the output of gate 431 is high; and if the thresholds of all three comparators are high, both AND gate outputs are low and the output on line 432 is high.

Figure 5:
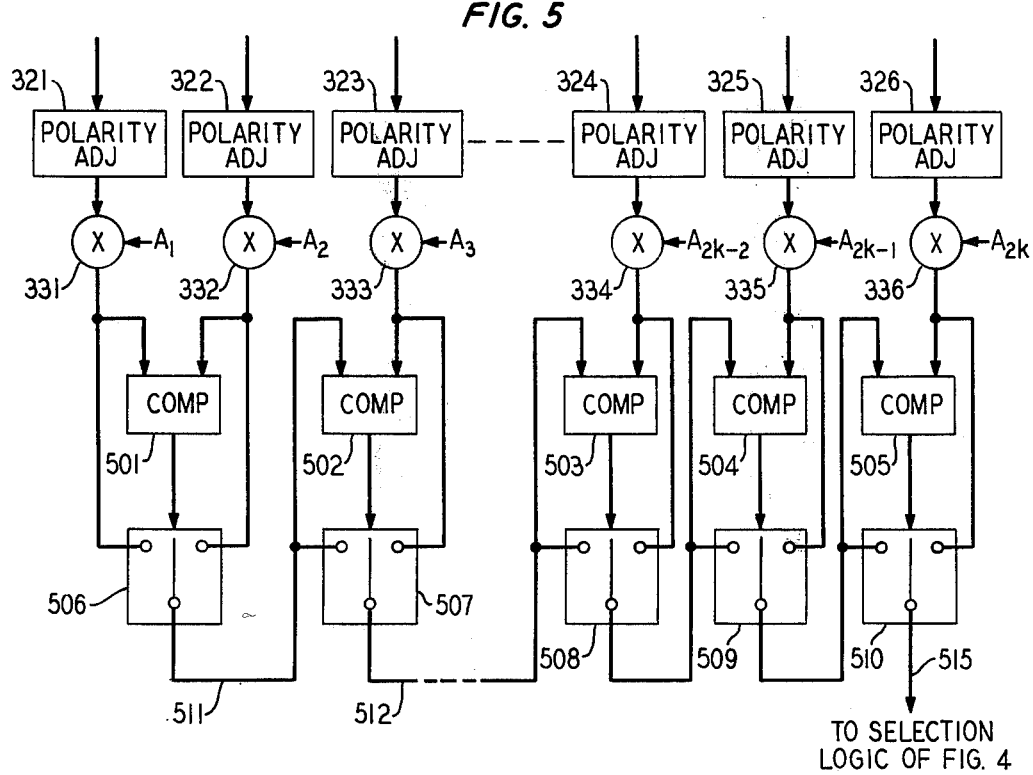
FIG. 5 is an alternate arrangement for the selection logic of FIG. 1.

While quantizer selection is made a function of the weighted average of luminance slopes using the circuit of FIG. 3, it may instead be desirable in certain instances to make the selection based on the maximum weighted luminance slope within the same neighborhood. If so, the circuitry shown in schematic form in FIG. 5 may be used. In this arrangement, a series of comparators 501-505 is provided, each of which control the position of an associated switch 506-510. Comparator 501 receives inputs from multiplier circuits 331 and 332, and couples the larger of these inputs to output line 511, by appropriately activating switch 506. Comparator 502 in turn receives inputs from multiplier circuit 333 and from output line 511, and the larger of the inputs is coupled to output line 512 by switch 507. The remaining comparators 503-505 and switches 508-510 compare, in turn, the remaining inputs from multiplier circuits 334-336 with the outputs from the preceding stages, so that the final output on line 515 represents the maximum values of the outputs of multiplier circuits 331-336. The line 515 output may then be connected to the selection logic of FIG. 4.

Figure 6:
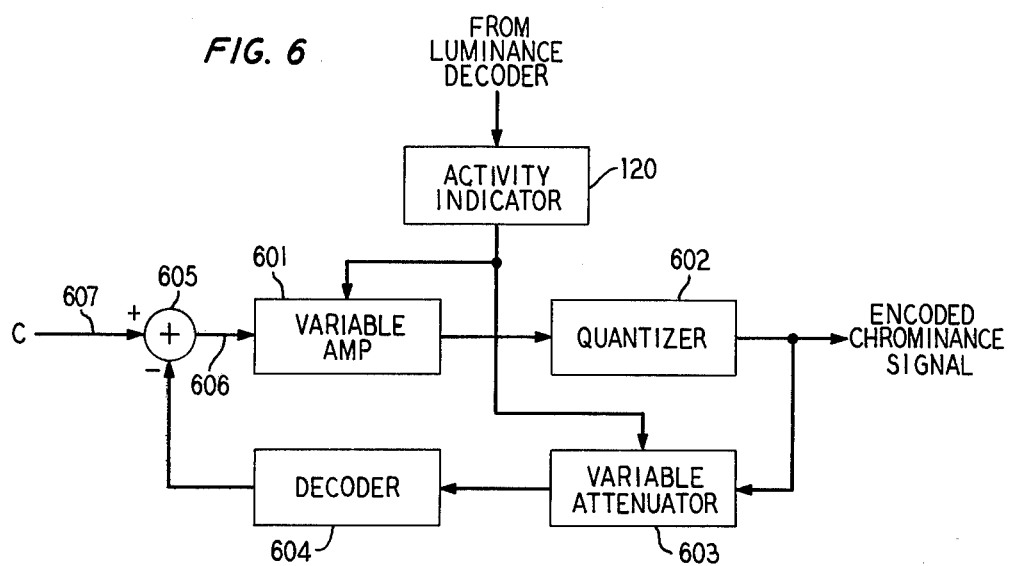
FIG. 6 is a block diagram of another embodiment of a chrominance encoder constructed in accordance with the present invention.

Another embodiment of the present invention, wherein the coding strategy of the chrominance DPCM encoder is changed in accordance with luminance spatial activity, is shown in FIG. 6. In this arrangement, the forward loop includes an amplifier 601 having a variable gain $\alpha$, the output of which is coupled to the input of a fixed quantizer 602. The feedback loop includes a variable attenuator 603 having inverse gain $1/\alpha$ for coupling the output of quantizer 602 to a fixed decoder 604. A comparator 605 is again provided for forming an error signal on line 606 by subtracting the output of decoder 604 from the input signal on line 607.

The gain $\alpha$ of amplifier 601 and the inverse gain $1/\alpha$ of attenuator 603 are together controlled, in the FIG. 6 arrangement, by the output of activity indicator 120. If the luminance activity is high, $\alpha$ is maintained low, so that only a portion of the range of quantizer 602 need be used, thereby effecting coarse quantization. On the other hand, if the luminance activity is low, $\alpha$ is made high, so that fine quantization is effected over the full range of quantizer 602.

Figure 7A:
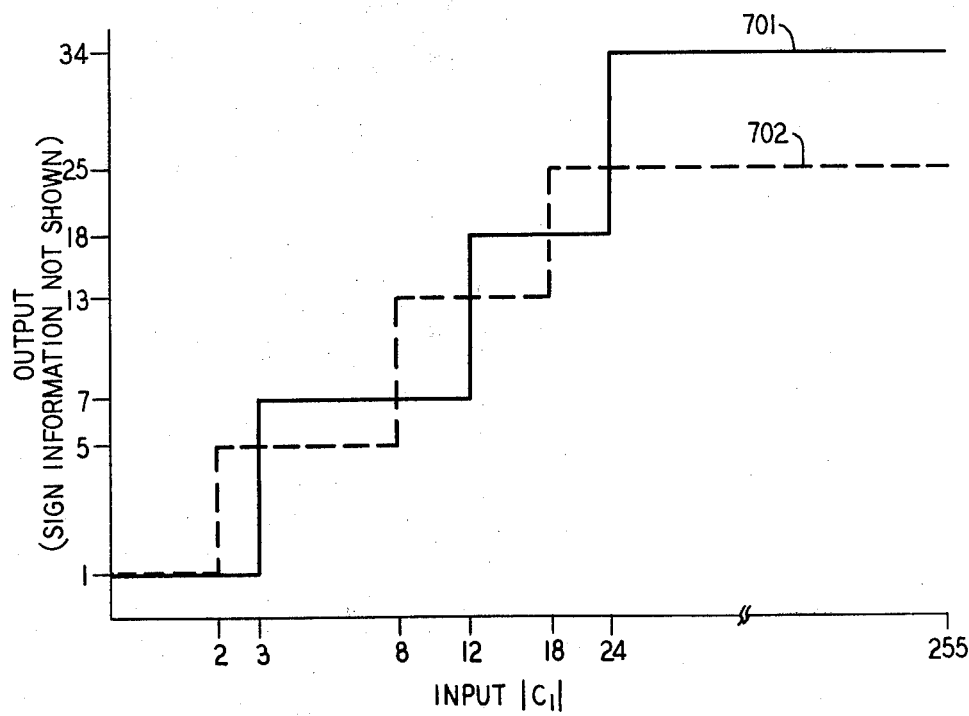
FIGS. 7a and 7b are graphs of the input/output characteristics of the quantizers that may be used in the C1 and C2 encoders, respectively, of FIG. 1.
Figure 7B:
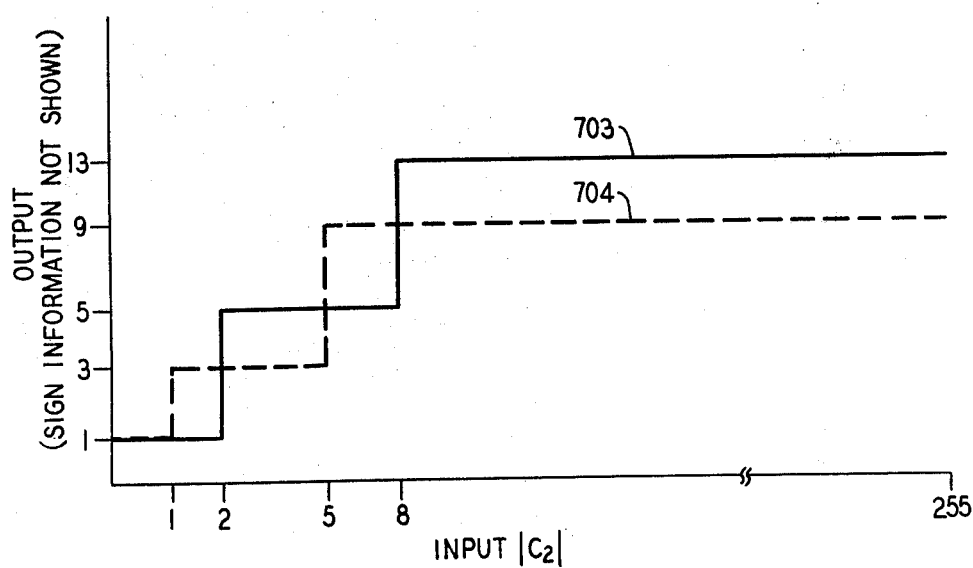

While it will be apparent to those skilled in the art that the present invention may be practiced using various "coarse" and "fine" quantizers, one set of levels found advantageous is graphically illustrated in FIGS. 7a and 7b. As shown in FIG. 7a, for a chrominance component $C_1$ in the range $\pm 255$, a coarse quantizer would produce the following input/output values, as illustrated by curve 701:

| INPUT $|C_1|$ | OUTPUT |
| --- | --- |
| $0 < |C_1| \leq 3$ | 1 |
| $3 < |C_1| \leq 12$ | 7 |

| INPUT $|C_1|$ | OUTPUT |
|---|---|
| $12 < |C_1| \leq 24$ | 18 |
| $24 < |C_1| \leq 255$ | 34 |

By way of comparison, a fine quantizer would produce the following input/output values, as illustrated by curve 702:

| INPUT $|C_1|$ | OUTPUT |
|---|---|
| $0 < |C_1| \leq 2$ | 1 |
| $2 < |C_1| \leq 8$ | 5 |
| $8 < |C_1| \leq 18$ | 13 |
| $18 < |C_1| \leq 255$ | 25 |

As shown in curves 703 and 704 of FIG. 7b, the chrominance component $C_2$ may have the following respective coarse and fine input/output characteristics:

| COARSE: INPUT $|C_2|$ | OUTPUT |
|---|---|
| $0 < |C_2| \leq 2$ | 1 |
| $2 < |C_2| \leq 8$ | 5 |
| $8 < |C_2| \leq 255$ | 13 |
| FINE: INPUT $|C_2|$ | OUTPUT |
| $0 < |C_2| \leq 1$ | 1 |
| $1 < |C_2| \leq 5$ | 3 |
| $5 < |C_2| \leq 255$ | 9 |

In the example given above, the coarse and fine quantizers are arranged to produce the same number of output bits, since both quantizers have the same number of levels. Specifically, the $C_1$ quantizers have eight possible levels (four positive and four negative) and thus require a 3-bit output, while the $C_2$ quantizers have six possible levels (three positive and three negative) and also require a 3-bit output. However, as stated previously, the switched quantizer produce a noticeably better picture quality than would result from the use of a single, fixed quantizer in each of the $C_1$ and $C_2$ encoders.

As another example, the quantizers may be arranged as shown in the following table:

| | $C_1$ Quantizers | |
|---|---|---|
| Coarse: | Input | Output |
| | $0 < |C_1| \leq 12$ | 4 |
| | $12 < |C_1| \leq 255$ | 23 |
| Fine: | Input | Output |
| | $0 < |C_1| \leq 3$ | 1 |
| | $3 < |C_1| \leq 9$ | 6 |
| | $9 < |C_1| \leq 17$ | 13 |
| | $17 < |C_1| \leq 255$ | 22 |

| | $C_2$ Quantizers | |
|---|---|---|
| Coarse: | Input | Output |
| | $0 < |C_2| \leq 6$ | 2 |
| | $6 < |C_2| \leq 255$ | 13 |
| Fine: | Input | Output |
| | $0 < |C_2| \leq 1$ | 1 |
| | $1 < |C_2| \leq 5$ | 3 |
| | $5 < |C_2| \leq 10$ | 8 |
| | $10 < |C_2| \leq 255$ | 13 |

In the above example, the coarse $C_1$ quantizer has four possible levels, and requires a 2-bit output, while the fine quantizer has eight possible levels, which requires a 3-bit output. Accordingly, one bit is saved when coarse quantization is effected. For a typical image, the overall savings in bit rate for the chrominance components may be 20–30 percent, without sacrificing picture quality as compared to prior art fixed quantizer systems.

Figure 8:
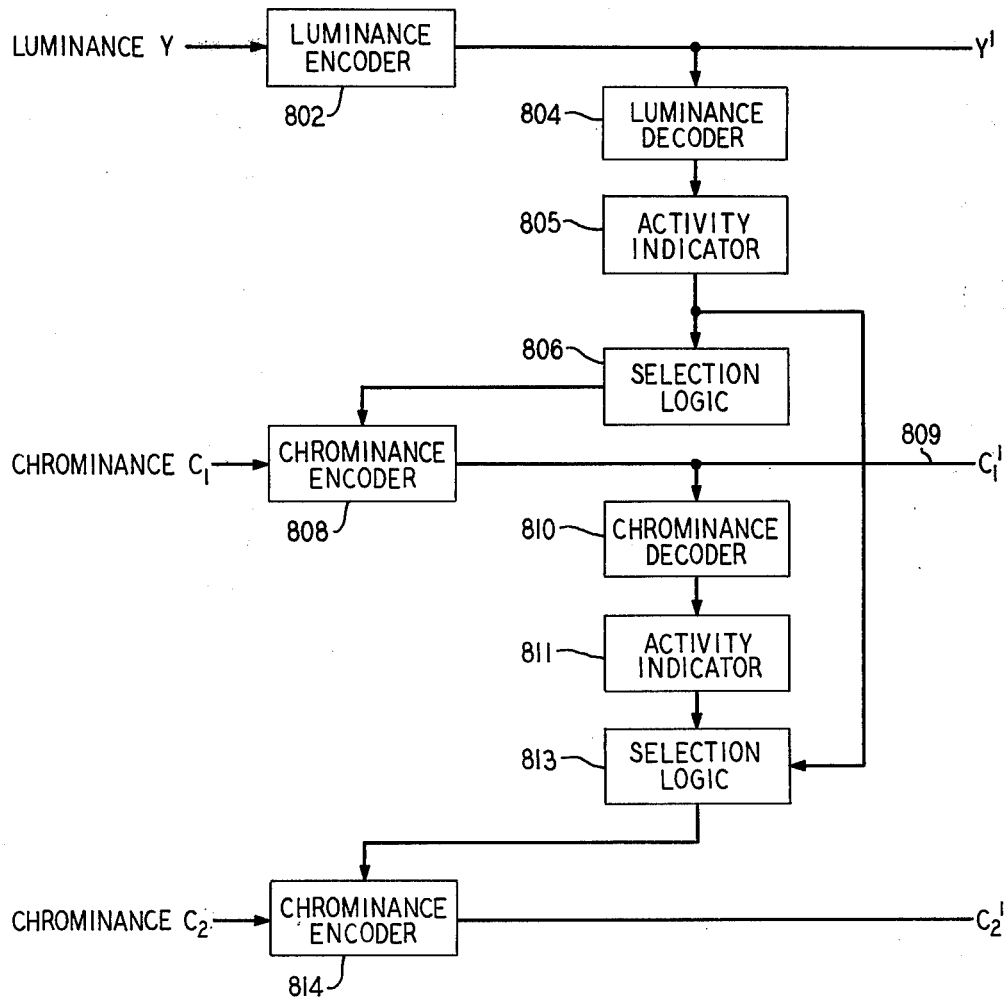
FIG. 8 is a block diagram of apparatus in accordance with the invention for varying the encoder precision of one chrominance signal based upon the spatial activity of both the other chrominance signal and the luminance signal.

If desired, the present invention may be extended so that the precision of the encoding of one chrominance component is made jointly dependent upon the spatial activity of both the luminance signal as well as the other chrominance component. As shown in FIG. 8, quantizer selection in chrominance encoder 808 is made based upon luminance activity by applying the output of luminance encoder 802 serially to luminance decoder 804, activity indicator 805 and selection logic 806, as heretofore explained. Similarly, a measure of chrominance spatial activity is obtained by applying the output of encoder 808 to chrominance decoder 810, and thence to a second activity indicator circuit 811. The outputs of both activity indicator circuits 805 and 811 are then combined in selection logic 813, the output of which is used to control quantizer selection within chrominance encoder 814.

Since still other adaptions and modifications of the present invention will be readily apparent to those skilled in the art, it is intended that the invention be limited in scope only by the appended claims. For example, while the encoders of FIGS. 1 and 6 are of the DPCM type, it should be understood that the invention is equally applicable to PCM (pulse code modulation) encoders. Also, it should be apparent that the activity indicator circuitry of FIG. 3 can operate on either digital or analog signals, with appropriate choice of circuit components.

What is claimed is:

1. Apparatus for encoding at least one of the chrominance signals which provide color information for a selected portion of a scene represented by a luminance signal, comprising:

means responsive to said luminance signal for generating an activity signal indicative of the spatial activity in said selected scene portion;

means for generating from said chrominance signal a digital representation thereof having a controllable degree of precision; and means responsive to said activity signal generating means for controlling the degree of said precision in inverse relation to said activity signal.

2. The invention defined in claim 1 wherein said activity signal generating means includes:

a delay line having a succession of stages each having an output terminal connected to an input terminal of a succeeding stage, each of said stages capable of storing the value of a single luminance sample within said selected portion of said scene;

a plurality of subtraction circuits each arranged to form the difference between the signals at the input and output terminals of an associated one of said stages;

a plurality of multiplier circuits each arranged to form the product of the output signal of an associated one of said subtraction circuits and a preselected weighting coefficient; and a summing circuit for combining the output signals of said multiplier circuits to form said activity signal.

3. The invention defined in claim 1 wherein said digital representation generating means includes at least first and second quantizers, said first quantizer operative to coarsely quantize an input signal supplied thereto and said second quantizer operative to finely quantize said input signal applied thereto, and wherein said controlling means includes means for establishing a reference level and means for operating said first quantizer when said activity signal exceeds said reference level and for operating said second quantizer when said activity signal is less than said reference level.

4. The invention defined in claim 1 wherein said digital representation generating means includes:

a. a differencing circuit for generating an error signal by subtracting an analog version of said digital representation from said chrominance signal;

b. a forward loop for receiving said error signal and generating said digital representation, said forward loop including an amplifier of variable gain $\alpha$ serially connected to a quantizer; and c. a feedback loop for receiving said digital representation and generating said analog version, said feedback loop comprising an attenuator of inverse gain $1/\alpha$ serially connected to a decoder;

and wherein said controlling means is arranged to control $\alpha$ in inverse relation to said activity signal.

5. The invention defined in claim 1 wherein said activity signal generating means includes:

a. means for storing the value of luminance samples within said selected portion of said scene;

b. means for computing the differences between particular ones of said stored luminance sample values;

c. means for weighting said differences in accordance with predetermined weighting coefficients; and d. means for forming said activity signal from the maximum one of said weighted differences.

6. The invention defined in claim 5 wherein said selected portion of said scene includes $n$ samples lying along a single scan line;

said storing means includes a delay line having $n$ serially interconnected stages each having an input terminal and an output terminal; and said computing means includes $n$ subtracting circuits each for forming the difference between signals present at said input and output terminals of an associated one of said stages.

7. Apparatus for digitally encoding the chrominance component of a color video signal having a corresponding luminance component, comprising:

first means for generating an activity signal of magnitude directly proportional to the spatial activity of said luminance component in a particular neighborhood of the image represented by said color video signal;

second means for generating a digital version of said chrominance component in said particular neighborhood of said image, said second means including at least a first quantizer operative to encode said chrominance component with a relatively high degree of precision and a second quantizer operative to encode said chrominance component with a relatively low degree of precision; and third means for operating said first quantizer when said activity signal is relatively low and for operating said second quantizer when said activity signal is relatively high.

8. The invention defined in claim 7 wherein said third means includes a source of reference potential, a comparator for generating a control signal if said reference signal exceeds said activity signal; and a switch for operating said first quantizer in response to the presence of said control signal and for operating said second quantizer in the absence of said control signal.

9. The invention defined in claim 8 wherein said first means includes:

means for storing a plurality of consecutive samples of said luminance component;

means for forming the differences between adjacent ones of said stored samples;

means for multiplying each of said differences by a preselected weighting coefficient; and means for combining said multiplied differences to form said activity signal.

10. The invention defined in claim 9 wherein said storing means includes a delay line having a plurality of serially interconnected stages;

said difference forming means includes a plurality of subtractor circuits each connected to the input and output terminals of an associated one of said stages; and said accumulating means includes a summing circuit.

11. A method of encoding at least one of the chrominance signals which provide color information for a selected portion of a scene represented by a luminance signal, comprising the steps of:

generating, in response to said luminance signal, an activity signal indicative of the spatial activity in said selected scene portion;

generating from said chrominance signal a digital representation thereof having a controllable degree of precision; and controlling in response to said activity signal, the degree of said precision in inverse relation to said activity signal.

12. The method of claim 11 wherein said activity signal generating step includes the steps of:

storing a plurality of consecutive samples of said luminance signal;

forming the differences between adjacent ones of said stored samples;

multiplying each of said differences by a preselected weighting coefficient; and combining said multiplied differences to form said activity signal.

13. The method of claim 12 wherein said digital representation generating step includes the step of selectively quantizing said chrominance signal in either a coarse quantizer or a fine quantizer; and said controlling step includes the steps of:

establishing a reference level signal, comparing said activity signal to said reference level signal, and activating said coarse quantizer only if said activity signal exceeds said reference level signal.

* * * * *